United States Patent
Lang et al.

(10) Patent No.: US 10,465,799 B2
(45) Date of Patent: *Nov. 5, 2019

(54) SEALING ASSEMBLY AND METHOD FOR MONITORING DYNAMIC PROPERTIES OF A SEALING ASSEMBLY

(71) Applicants: Aktiebolaget SKF, Gothenburg (SE); SKF Economos Deutschland GmbH, Bietigheim-Bissingen (DE)

(72) Inventors: Defeng Lang, Delft (NL); Muhammad Ahmer, Hisings Backa (SE); Thomas Deigner, Lauffen (DE); Jos Holsnijders, Leerdam (NL); Sebastian Ziegler, Bamberg (DE); Frank de Wit, Noordeloos (NL)

(73) Assignees: Aktiebolaget SKF, Göteborg (SE); SKF Economos Deutschland GmbH, Bietigheim-Bissingen (DE)

( * ) Notice: Subject to any disclaimer, the term of this patent is extended or adjusted under 35 U.S.C. 154(b) by 99 days.

This patent is subject to a terminal disclaimer.

(21) Appl. No.: 15/531,056

(22) PCT Filed: Nov. 23, 2015

(86) PCT No.: PCT/EP2015/077320
§ 371 (c)(1),
(2) Date: May 26, 2017

(87) PCT Pub. No.: WO2016/083286
PCT Pub. Date: Jun. 2, 2016

(65) Prior Publication Data
US 2017/0321808 A1    Nov. 9, 2017

(30) Foreign Application Priority Data

Nov. 27, 2014  (GB) .................................. 1421045.4

(51) Int. Cl.
*G01M 13/04* (2019.01)
*F16J 15/3296* (2016.01)
(Continued)

(52) U.S. Cl.
CPC ......... *F16J 15/3296* (2013.01); *F16C 19/527* (2013.01); *F16C 33/7856* (2013.01);
(Continued)

(58) Field of Classification Search
USPC .............................. 73/114.77, 114.81, 115.07
See application file for complete search history.

(56) References Cited

U.S. PATENT DOCUMENTS 4,748,850 A   6/1988  Kataoka
6,003,872 A   12/1999 Nord
(Continued)

FOREIGN PATENT DOCUMENTS

CN    1380499 A    11/2002
CN    1723385 A    1/2006
(Continued)

*Primary Examiner* — Eric S. McCall
(74) *Attorney, Agent, or Firm* — Bryan Peckjian; SKF USA Inc. Patent Dept.

(57) ABSTRACT

The invention provides a sealing assembly that includes an elastic seal lip having a movable part. The seal lip is configured to be attached to a first part of a machine and to be in sliding contact with a second part of the machine. It is proposed that at least one vibration sensor is fixed to the movable part of the seal lip.

9 Claims, 3 Drawing Sheets

(51) Int. Cl.
   *G01P 15/18*      (2013.01)
   *G01M 13/005*     (2019.01)
   *G01M 13/045*     (2019.01)
   *F16C 33/78*      (2006.01)
   *F16C 41/00*      (2006.01)
   *G01P 1/02*       (2006.01)
   *F16C 19/52*      (2006.01)

(52) U.S. Cl.
   CPC .......... *F16C 33/7876* (2013.01); *F16C 41/00* (2013.01); *G01M 13/005* (2013.01); *G01M 13/045* (2013.01); *G01P 1/023* (2013.01); *G01P 15/18* (2013.01); *F16C 2233/00* (2013.01)

(56) References Cited

U.S. PATENT DOCUMENTS

| | | | |
|---|---|---|---|
| 6,237,403 | B1 | 5/2001 | Oldenettel |
| 6,672,681 | B1* | 1/2004 | Moretti ............... B61F 15/20 301/109 |
| 8,966,978 | B2 | 3/2015 | Pannek |
| 9,714,883 | B2 | 7/2017 | Lee |
| 9,958,345 | B2 | 5/2018 | Ichikawa |
| 9,960,641 | B2 | 5/2018 | Ichikawa |
| 2002/0051593 | A1 | 5/2002 | Oka |
| 2003/0042890 | A1 | 3/2003 | Normann |
| 2006/0006601 | A1 | 1/2006 | Hufnagel |
| 2006/0250228 | A1 | 11/2006 | Mori |
| 2007/0059857 | A1 | 3/2007 | Sooriakumar |
| 2009/0315267 | A1 | 12/2009 | Castleman |
| 2009/0317028 | A1* | 12/2009 | Castleman ............ F16C 17/24 384/448 |
| 2010/0010770 | A1 | 1/2010 | Helck |
| 2010/0039381 | A1 | 2/2010 | Cretella, Jr. |
| 2010/0074567 | A1* | 3/2010 | Giordana ............ G01L 5/0009 384/448 |
| 2010/0135604 | A1* | 6/2010 | Ozaki ................... B60B 27/00 384/448 |
| 2010/0307218 | A1 | 12/2010 | Meuter |
| 2011/0103690 | A1 | 5/2011 | Napper |
| 2012/0042727 | A1 | 2/2012 | Egedal |
| 2012/0210791 | A1 | 8/2012 | Pannek |
| 2013/0305842 | A1 | 11/2013 | Meuter |
| 2014/0049008 | A1* | 2/2014 | Ziegler ............... F16J 15/3296 277/320 |
| 2016/0123470 | A1* | 5/2016 | Glaentz ............. F16J 15/3208 277/553 |
| 2017/0030804 | A1* | 2/2017 | de Wit .................... F16C 41/00 |
| 2017/0322095 | A1* | 11/2017 | Lang .................... F16J 15/3296 |
| 2018/0149205 | A1* | 5/2018 | Den Haak ........... H02K 7/1807 |
| 2018/0266265 | A1* | 9/2018 | Gerbi ...................... F16J 15/40 |
| 2018/0283557 | A1* | 10/2018 | Lang .................... F16J 15/3296 |

FOREIGN PATENT DOCUMENTS

| | | |
|---|---|---|
| CN | 1748091 A | 3/2006 |
| CN | 101166912 A | 4/2008 |
| CN | 101175926 A | 5/2008 |
| CN | 101238302 A | 8/2008 |
| CN | 101292090 A | 10/2008 |
| CN | 101326431 A | 12/2008 |
| CN | 101400979 A | 4/2009 |
| CN | 102036869 A | 4/2011 |
| CN | 103097755 A | 5/2013 |
| DE | 102006060382 A1 | 6/2008 |
| DE | 102013208209 A1 | 11/2014 |
| EP | 0517082 A2 | 12/1992 |
| JP | 2006300702 A | 11/2006 |
| JP | 2009236821 A | 10/2009 |
| JP | 2012149716 A | 8/2012 |
| JP | 2012179928 A | 9/2012 |
| WO | 8304436 A1 | 12/1983 |
| WO | 2011069519 A1 | 6/2011 |
| WO | 2012098980 A1 | 7/2012 |
| WO | 2013000865 A1 | 1/2013 |
| WO | 2013104426 A1 | 7/2013 |

\* cited by examiner

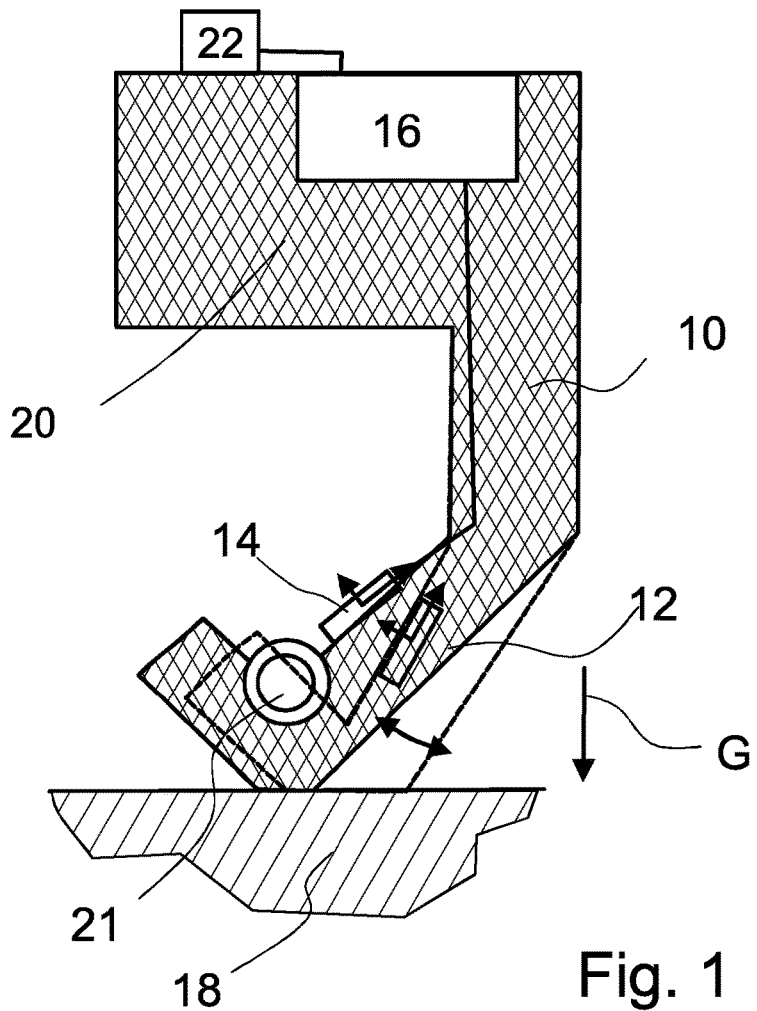
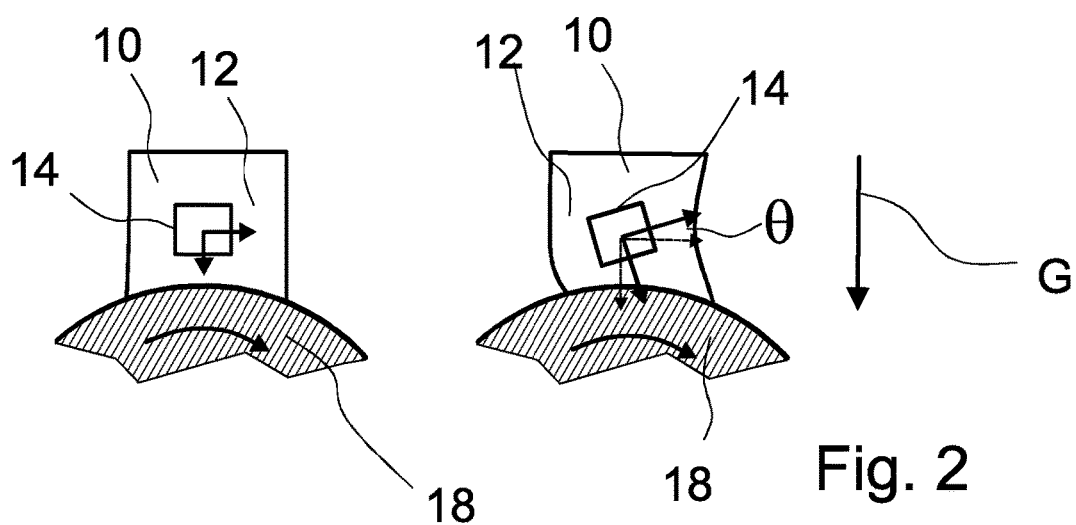
Fig. 1
Fig. 2

SEALING ASSEMBLY AND METHOD FOR MONITORING DYNAMIC PROPERTIES OF A SEALING ASSEMBLY

CROSS REFERENCE

This is a United States National Stage Application claiming the benefit of International Application Number PCT/EP2015/077320 filed on Nov. 23, 2015, which claims the benefit of British Patent Application 1421045.4 filed on Nov. 27, 2014, both of which are incorporated herein by reference in their entireties.

BACKGROUND OF THE INVENTION

Bearings are often used as critical parts in complex machines and bearing failure may lead to major damages. Replacing bearings may be complicated and results in downtime. The bearing lifetime depends strongly on the quality of the lubrication and of the seals. Monitoring the quality of the seals and of the lubrication is therefore highly desirable.

Further, it is proposed to use vibration sensors attached to rigid metallic machine parts in order to monitor the machine and to be able to stop the machine for maintenance if unexpected vibrations are detected.

The progress in mobile telecommunication technology has brought about a new generation of semiconductor-based accelerometers for use in smartphones which are highly miniaturized.

SUMMARY OF THE INVENTION

The invention seeks to provide a sealing assembly with means for monitoring its function in a reliable way.

The invention starts from a sealing assembly including a seal body and an elastic seal lip having a movable part attached to the seal body, wherein said seal body is configured to be attached to a first part of a machine and the movable part is configured to be in sliding contact with a second part of the machine.

It is proposed that at least one vibration sensor is fixed to the movable part of the seal lip. The inventors have found that vibrations of the elastic sealing parts convey valuable information on the sealing performance. The invention enables using this information for monitoring purposes, triggering maintenance or emergency stops or for obtaining information on the use of the machine. The seal lip can be made of rubber or other kind of elastomer or polymer material.

Further, it is proposed that the sealing assembly includes a data processing device for processing data obtained from the vibration sensor and for monitoring the vibration signals obtained by the sensor. The signals can be evaluated immediately and used to generate signals for the user of the machine.

Preferably, the data processing device is configured to identify a predetermined operational event in the regular operation of the machine including the sealing assembly and to monitor the vibration signals obtained by the sensor in response to the operational event. In a preferred embodiment of the invention, the predetermined operational event is a ramp-up of a speed of the machine. Other suitable events are shock loads or the like. Preferably, the predetermined events are chosen such that the response of the system expected for a perfectly elastic and lubricated sealing system would always be the same. Differences in the response would, therefore, indicate that there is room for improvement in the sealing performance, that the sealing is worn out or aged. The differences may be determined by comparing the signals with signals of other sealing systems operating under the same external conditions or with signals obtained earlier.

By making use of impulses or other repeatedly occurring characteristic events of the application, which periodically occur, a frequency response function can be calculated. One example is a crankshaft-seal of a marine combustion engine.

The signal can also be used for other parameter checks of the application. A frequency response function derived from the sensor signals coupled to the temperature might be used to calculate damping (related to lubrication), stiffening (related to aging).

Accordingly, the data processing device may be configured to evaluate a change in the vibration signals obtained by the vibration sensor in response to the operational event with respect to a signal obtained for a new sealing assembly in order to determine a parameter indicative of a degradation of the sealing assembly and to issue a warning signal if the degradation exceeds a threshold value.

In one embodiment of the invention, the data processing device is configured to extract a high frequency part of the signal of the vibration sensor and to derive elastic properties of the seal lip from the high frequency part of the signal.

Preferably, the data processing device is configured to determine a parameter indicative of the lubrication quality based on high frequency components of the signal obtained by the sensor. The inventors have found that the lubrication condition can be detected by the signal amplitude. Lack of lubrication results in a micro-mechanical contact during a very short time. This generates high frequency signals in the seal lip, to be measured with the accelerometer. A frequency shift (measured over a time interval) might give an indication of a bad lubrication condition.

In addition, the data processing device may be configured to calculate a parameter indicating ageing of the sealing lip. As the elasticity of the rubber or other kind of elastomer or polymer of the elastic element decreases due to ageing, the elastic element tends to become stiffer.

It is further proposed that the vibration sensor is formed as a gravitation sensor, in particular as a 3D-accelerometer: A 3D-gyro-sensor or a combined unit including both a 3D-accelerometer and a 3D-gyro-sensor could be used as well, provided that the response is quick enough. Sensors of this kind are available in high quality at a low price on the market. While the technical prejudice that the integration of sensors into sealing lips is difficult still exists in the field of bearing seals or other sealing assemblies, the inventors have surprisingly found that the miniaturization and robustness of this class of sensors is sufficiently advanced to open this new field of applications.

Preferably, the acceleration sensor is formed as a 3-axis gravity sensor semiconductor chip. A pertinent data processing device may be configured to determine the orientation of the acceleration sensor in relation to the direction of gravity. The data processing device may be included in a sensor pack containing the acceleration sensor for large-size sealing lips, attached to a ring of the bearing or located in a remote control unit of a machine including the bearing.

The inclusion of a 3D acceleration sensor on the seal-lip for measuring shaft vibration, dynamic run-out, etc., has a pleasant side effect, namely, as it is a DC sensor it can measure the earth's gravity field. If the seal lip is in a position that seal lip wear causes a change of angle of the sensor (which is likely in most machines) this causes a change (via the arcsine of the angle between sensor and gravity vector) in the sensor offset that can be measured.

The preferred embodiment works on the measurement of the gravity vector as it acts on the nano-scale structures of a 3D acceleration chip. When the seal lip wears out, its angle towards the body material changes. The connection between seal lip and seal body acts as a hinge. The sensor is also rotated and, together with it, the sensitive surface. Depending on the sensor orientation, none, one or more of the surfaces undergo a rotation and the rotation leads to a different offset for the surface. Given the set of offsets corresponding to the original orientation and the typical lack of drift of the sensor itself, over time a change in the vectors can be measured as the seal lip wears out. Given the seal geometry, this change can be calculated back to seal lip wear. The invention works for both, rotation applications and linear motion applications.

In a preferred embodiment of the invention, the sealing assembly includes a data processing device and a temperature sensor, wherein said data processing device is configured to determine a degradation of the seal lip based on a combination of signals from the vibration sensor and from the temperature sensor. The signals of the temperature sensor can be used to discount temperature-dependent effects, in particular effects of the temperature on the lubrication.

The invention lends itself in particular to monitoring the seals of a bearing. While the invention may be applied to applications with linear motion between the first part and the second part as well, it is preferred that the first part of a machine and the second part of the machine are bearing rings. However, the invention is equally applicable to seals with sliding contact to a rotating shaft.

Further aspects of the invention relate to a bearing including a seal assembly as described above and a machine including such a bearing.

A further aspect of the invention relates to a method for monitoring a sealing assembly including a seal body and an elastic seal lip having a movable part attached to the seal body, wherein said seal body is configured to be attached to a
first part of a machine and the movable part is configure to be in sliding contact with a second part of the machine. The method includes evaluating the signals of at least one vibration sensor fixed to the movable part of the seal lip.

In a further embodiment of the invention, the data processing device is configured to calculate a parameter indicating a stiction of the sealing lip from the orientation of the acceleration sensor and/or from a frequency spectrum of the vibration sensor obtained when the machine starts.

The following non-limiting description of embodiments of the invention as well as the appended claims and Figures show multiple characterizing features of the invention in specific combinations. The skilled person will easily be able to consider further combinations or sub-combinations of these features in order to adapt the invention as defined in the claims to his or her specific needs.

BRIEF DESCRIPTION OF THE FIGURES

FIG. 1 illustrates a sealing assembly according to the invention in a sectional view;
FIG. 2 illustrates a sealing assembly according to the invention in an axial view.

DETAILED DESCRIPTION OF THE EMBODIMENTS

Figure 3:
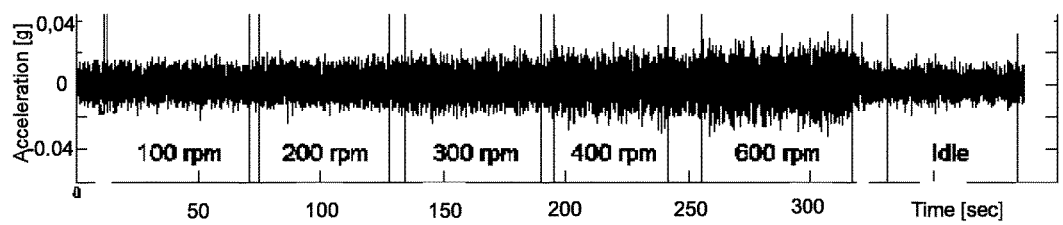
FIG. 3 is a schematic graph showing a vibration level in a radial direction of the seal for a first measurement run.

FIG. 1 illustrates a sealing assembly including an elastic seal lip 10 having a movable part 12, wherein said seal lip 10 is configured to be attached to a first part of a machine formed as a non-rotating ring (not shown) of a bearing and to be in sliding contact with a second part 18 of the machine formed as a rotating ring of the bearing. In other embodiments of the invention, the second part 18 is a shaft.

The sealing assembly comprises a rubber or polymer ring with a profile as illustrated in FIG. 1. The ring includes a seal body 20 and a seal lip 10 protruding radially from the seal body 20 toward the rotating ring 18. If necessary, the seal lip 10 is preload-ed with a garter spring 21. The seal lip 10 has a radial portion and an inclined portion connected to the radial portion by a rotation hinge.

A vibration sensor 14 formed as an acceleration sensor, specifically as a 3-axis semiconductor-based gravity sensor 14, is fixed to the inclined portion which constitutes the movable part 12 of the seal lip 10 on a side facing the seal body 20. A data processing device 16 reads out the signals of the acceleration sensor 14 and evaluates the signals as described in further detail below. The direction of gravity G
is indicated with an arrow, and the sensor is configured to output the components of the gravity acceleration as the DC part of its signal.

The inclined portion extends from the seal body 20 toward a sliding contact surface of the rotating ring. The seal lip 10 is pressed onto the sliding contact surface by a ring.

The dashed lines in FIG. 1 show the configuration of the seal lip 10 when the latter is worn out. The inclination of the inclined portion changes as a consequence of wear. The sensor 14 is also rotated and, together with it, the sensitive surfaces of the sensor. Depending on the sensor 14 orientation, none, one or more of the surfaces undergo a rotation and this rotation leads to a difference in the offset signal for the surface corresponding to the changing components of the gravitational acceleration. Over time, a change in the vectors can be measured as the seal lip 10 wears out. Given the seal geometry, this change can be calculated back to seal lip 10 wear by the data processing device 16, which may output or store the values of the wear and/or issue warning signals if the wear reaches a critical threshold. In embodiments where a further gravitation sensor 14 is mounted on a non-moving part of the machine or of the bearing, it is possible to monitor relative changes of the orientation of the seal lip 10. In both cases, the data processing device 16 is configured to determine the orientation of the acceleration sensor 14 in relation to the direction of gravity and to calculate a parameter indicating wear of the sealing lip from the orientation of the acceleration sensor 14.

FIG. 2 illustrates an embodiment where the data processing device 16 is configured to calculate a parameter indicating a stiction of the sealing lip from the orientation of the acceleration sensor 14.

The stiction causes a deformation of the seal in the direction of rotation. The solid lines in FIG. 2 show a configuration of a portion of the seal lip 10 with low stiction, and the dashed lines show the stiction deformation for higher friction. The deformation is a torsional strain deformation wherein the radially inner part of the seal lip 10 is rotationally deflected with respect to its radially outer portion.

The acceleration sensor 14 is mounted on the seal such that it can sense vibration (AC) and rotation of the shaft (DC). The rotation angle θ will be in the signal of the measured tangential and radial components. A calibrated x,y,z to polar translation has been demonstrated to be able to convert the sensor 14 signals into usable bearing shaft coordinates. The rotational component tells us about the amount of stiction of the seal to the shaft. The same principle can also be used in torque and/or load sensing. Of course, in that case it would not be a shaft/seal combination but something static like an arm that is bent, and as such changes its angle with respect to the earth's gravitational vector.

Further, a temperature sensor 22 is mounted in the bearing including the seal lip.

While the functions explained above focus on the DC part of the sensor 14 signal, it is possible to retrieve information on dynamic forces acting on the seal by using the AC component of the signal as described in further detail below.

Possible embodiments of the invention include embodiments where the data processing device 16 is configured to derive at least one parameter describing a dynamic behavior of the sealing assembly and its lubrication from the data obtained from the acceleration sensor 14 by accounting for the temperature measured by the temperature sensor 22. In particular, the data processing device 16 may be configured to evaluate an amplitude and/or a spectrum of vibrations of the seal lip 10 from the data obtained from the acceleration sensor 14 and to issue a warning signal if the amplitude and/or the spectrum of vibrations meets a set of predetermined criteria.

Embodiments of the last mentioned type will be described in the following. The features of all of the embodiments may easily be combined in the sense that the data processing device 16 determines multiple parameters relating to different aspects of the static and dynamic behavior of the sealing.

In one embodiment of the invention, the data processing device 16 is configured to measure the aging of the seal over time. Aging changes the damping and resonance frequency. The data processing device 16 may determine how the seal lip 10 moves in response to a shock or impulse occurring at predetermined operational events, e.g. each time when the machine is starting or ramping up its speed.

In one embodiment of the invention, the data processing device 16 is configured to check the seal condition and lip contact with a defined shock wave input, e.g., by the ignition of the combustion engine at each stroke or other defined input. Measuring an impulse response function may be done with an artificial impulse. An impulse generator may be attached to the seal lip 10 for this purpose. Generally, the data processing device 16 may be configured to identify a predetermined operational event in the regular operation of the machine including the sealing assembly and to monitor the vibration signals obtained by the sensor 14 in response to the operational event.

Certain applications have events which occur several times during a certain time period; for example a ramp-up of speed during a start-up. This event can be monitored by the acceleration sensor 14. The start-up can be considered as a speed ramp. Measuring the acceleration (3DOF) during this ramp-up gives information about the damping and seal (and maybe also system) resonance. A comparison of the measurements over time (during the same start-up events), i.e. a comparison with response signals measured or expected for an ideal or new sealing system, can give an indication of aging or wear. The data processing device 16 is configured to evaluate a change in the vibration signals obtained by the vibration sensor 14 in response to the operational event with respect to a signal obtained for a new sealing assembly in order to determine a parameter indicative of a degradation of the sealing assembly and to issue a warning signal if the degradation exceeds a threshold value.

In a further embodiment of the invention, the data processing device 16 is configured to determine the seal lip 10 lubrication condition by the high frequency components in the signal. The inventors have found that this lubrication condition can be detected by the signal amplitude. Lack of lubrication results in a micro-mechanical contact, during a very short time. This generates high frequency signals in the seal lip 10, to be measured with the accelerometer. A frequency shift (measured over a time interval) might give an indication of a bad lubrication condition.

Further, the stick-slip effect of a seal when running up or stopping will start tangential forces in the seal lip 10. The forces result in an acceleration and can then be measured by the sensor 14. This provides information about the seal lip 10 lubrication and especially also about wear. When the lip no longer makes contact this signal will be lost, which can be detected.

In a further embodiment of the invention, it is proposed to use a special coded sensor 14 that sends extra information besides the data, or specific characteristic time difference between data packages, e.g., in order to identify the bearing. Today, type and size of the bearing are often shown on the seal outside. By using several accelerometers on the seal, it is possible to code the sensors 14 digitally with a code being unique for a certain bearing type. This code can be, for example, a digital code to access the sensor 14, before it can be used. In the conditioner a code can be generated which relates to the bearing ID and to the manufacturer. The format of the data transfer can also make a code which is unique for a certain bearing type.

In one embodiment of the invention, the data processing device 16 is configured to use the frequency data to sense the wear and friction condition. When friction goes up, the temperature increases such that more damping and less high frequency components exist in the signal.

It is further proposed to generate a 3D matrix map for a certain moment in time by analysis of the rotational speed and temperature in combination with the frequency response of the accelerometers. This map can be compared with different application conditions. When measuring this map within a predefined time interval, during known application conditions, one can follow the trend of wear, friction and aging.

In a further embodiment of the invention, the data processing device 16 is configured to determine measuring the rotation speed of the seal in a rotating seal application. In a rotating seal application, the sensor 14 can measure the rotation speed by using the gravity vector as a reference because the signal will be oscillating with the rotation frequency.

In a further embodiment of the invention, the data processing device 16 is configured to record the start and stop time stamp, frequency, and to calculate the actual running time. Via a threshold or pattern recognition function it can be detected that the bearing is running. This information, when integrated, will tell about the total runtime of the seal, and, when coupled to a timestamp, can be combined with the information from other sensors 14 on the total system.

In a further embodiment of the invention, the data processing device 16 is configured to record the abuse of the seal, e.g., large dynamic run-out; or in combination with a temperature sensor 14 the starting condition can be recorded. The inventors propose to include this function on the acceleration chip itself in order to prevent tampering. A large vibration lasting more than a certain period will trigger a destructive write process to a memory cell.

In a further embodiment of the invention, the data processing device 16 is configured to detect loss of preload of the bearing, which results in an increased axial vibration. This can be measured as a break in a trend. Loss of preload makes the axial forces on the shaft have a direct 1:1 coupling to the shaft mass. There is no longer the stiffness of the bearing to dampen the movement. Through the friction of the seal lip 10 this acceleration will immediately be transferred to the sensor 14.

In a further embodiment of the invention, the data processing device 16 is configured to detect a damage of a labyrinth seal by detecting contact vibration of a seal which should not contact the shaft normally. In a labyrinth seal the contact of the labyrinth walls from the static part to the rotating part has to be avoided as it will lead to excessive wear. The contacting introduces forces and from the forces there follows an acceleration. As the static seal wall acts as a brake, the deceleration on the rotating wall can be directly measured with the sensor 14. Given the short duration, this is a clear break from the trend. For this embodiment, the acceleration sensor 14 may be fixed to a seal lip 10 which is not designed to be in sliding contact with a second part 18 of the machine, but happens to establish sliding contact as a result of damage or wear.

The invention is not limited to seals with radial contact but can be applied to face seals in order to measure the axial movement. A face seal provides sealing in the axial direction.

In a further embodiment of the invention, the data processing device 16 is configured to detect a pumping effect of the seal by way of detecting certain axial and radial vibration patterns. The pumping action of the seal results in a repeated characteristic sinusoidal motion, which is relatively fast and coupled to the rotation speed, and, thus, in a detectable specific acceleration signal pattern.

In a further embodiment of the invention, the data processing device 16 is configured to measure the flat spot or imperfection of the tire, in truck or automotive applications. A flat spot on a tire results in two shocks transferred through the tire to the rim and then to the hub. From the hub it moves to the shaft and then to the bearing. There will be some dampening by the tire, but the metal masses are fairly stiff. The signal will arrive at the shaft and cause two consecutive unique radial force pulses that are transmitted into the seal lip 10. Again, this pattern deviates from the trend and can be detected.

The data processing device 16 implements a method for monitoring a sealing assembly including an elastic seal lip 10 having a movable part 12, wherein said seal lip 10 is configured to be attached to a first part of a machine and to be in sliding contact with a second part 18 of the machine. The method includes evaluating the signals of at least one acceleration sensor 14, which is fixed to the movable part 12 of the seal lip 10.

FIG. 3 is a schematic graph showing a vibration level in a radial direction of the seal for a first measurement run. The speed of a shaft supported by the bearing is increased under load in steps of 100 rpm up to 600 rpm and then returned to an idle mode as indicated on the graph. The vibration amplitude in the tangential direction increases with increasing rotation speed.

Figure 4A:
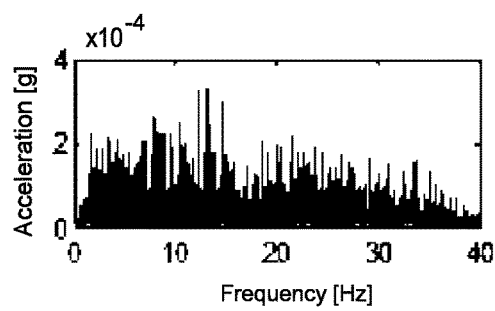
FIG. 4a-4d are frequency spectra of the signal according to FIG. 3 in different phases of the measurement run.
Figure 4B:
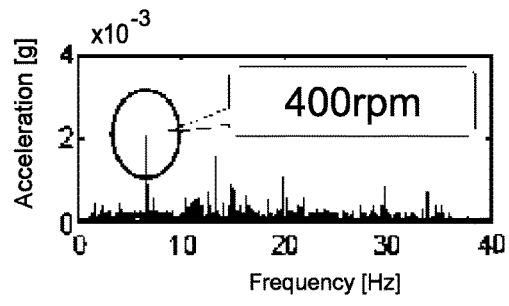
Figure 4C:
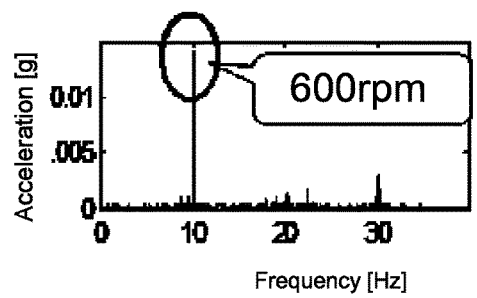
Figure 4D:
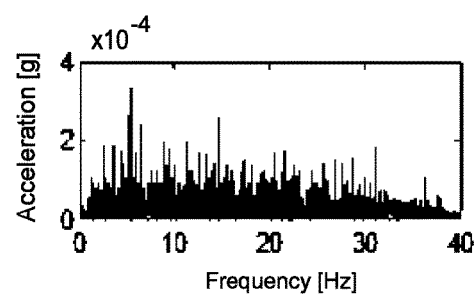

FIG. 4a-4d are frequency spectra of the signal according to FIG. 3 in different phases of the measurement run. FIG. 4a is a typical frequency spectrum for the low speed range of 100 rpm with a broad spectrum of tangential seal vibrations. FIGS. 4b and 4b are typical spectra for the high speed range of 400 rpm and 600 rpm where frequency peaks pertaining to the shaft rotation are clearly discernible. FIG. 4c is a typical spectrum for the idle mode.

Figure 5:
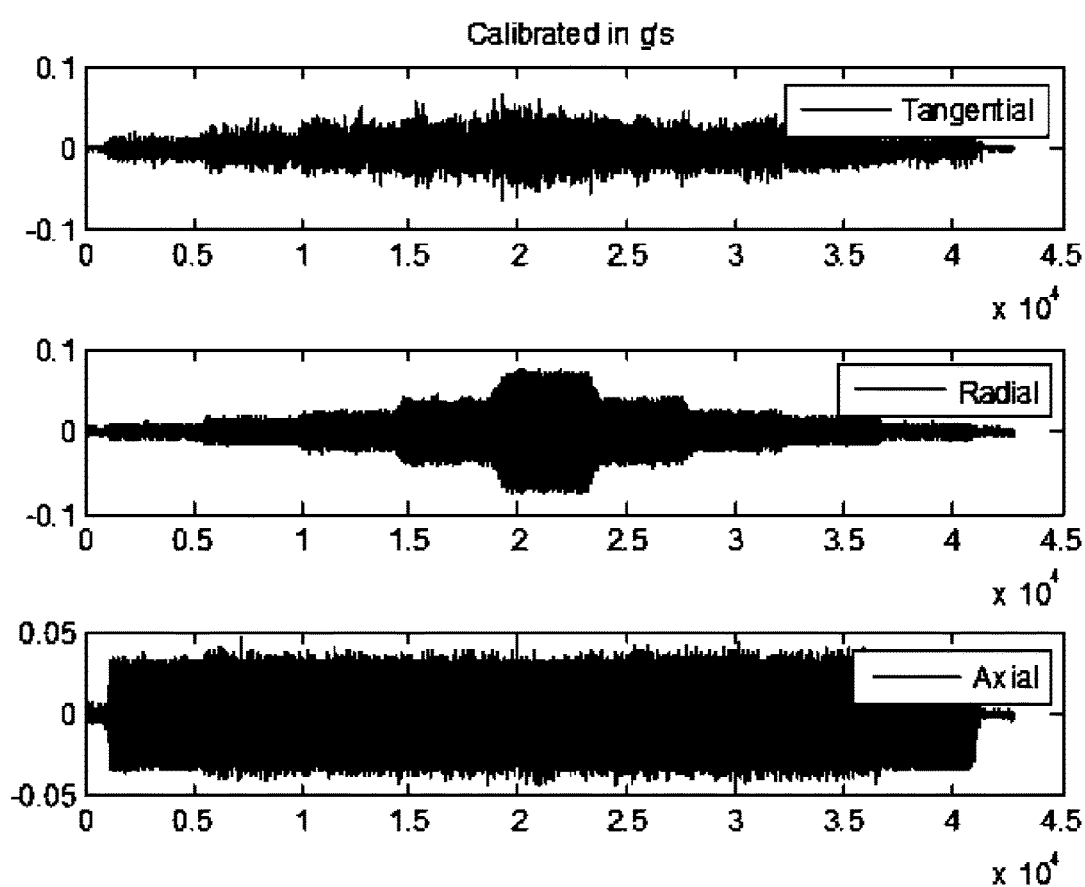
FIG. 5 is a schematic graph showing a vibration level in a tangential direction,
in a radial direction and in an axial direction of the seal for a further measurement run.

FIG. 5 is a graph showing, from top to bottom, actual measurements of a vibration level in a tangential direction, in a radial direction and in an axial direction of the seal for a further measurement run. The step-like shape of the envelope of the graph in the center pertaining to the radial vibration reflects a stepwise increase and subsequent decrease of the rotation speed of the shaft. The measurements shown increasing rotation speed.

The signals illustrated in FIGS. 3-5 can be used to calculate parameters such as the dynamic run-out by integrating the signals once or twice. The amplitude of the vibration in the tangential level depends on the friction of the seal lip on the contact surface on which it slides. The higher the friction, the bigger the amplitude of the tangential vibrations. The friction, in turn, depends on both the size of the contact area and on the lubrication. According to the invention, the size of the contact area can be determined from the DC part of the signal as described above with reference to FIG. 1. Accordingly, it is possible to isolate the effect of the lubrication on the amplitude.

The invention claimed is:

1. A sealing assembly comprising:
a seal body and an elastic seal lip having a movable part attached to the seal body, the seal body configured to be attached to a first part of a machine and the movable part is configured to be in sliding contact with a second part of the machine, wherein at least one vibration sensor is fixed to the movable part of the seal lip; and
a data processing device for processing data obtained from the vibration sensor and to monitor the vibration signals obtained by the sensor, the data processing device is configured to identify a predetermined operational event in the regular operation of the machine including the sealing assembly and to monitor the vibration signals obtained by the sensor in response to the operational event, wherein the predetermined operational event is a ramp-up of a speed of the machine.

2. The sealing assembly according claim 1, further comprising a temperature sensor, wherein said data processing device is configured to determine a degradation of the seal lip based on a combination of signals from the vibration sensor and from the temperature sensor.

3. The sealing assembly according to claim 1, wherein the first part of a machine and the second part of the machine are bearing rings.

4. The sealing assembly according to claim 1, wherein the vibration sensor is formed as a 3-axis gravity sensor semiconductor chip.

5. The sealing assembly according to claim 4, wherein the data processing device is configured to calculate a parameter indicating wear of the sealing lip from the orientation of an acceleration sensor.

6. A sealing assembly comprising:

a seal body and an elastic seal lip having a movable part attached to the seal body, the seal body configured to be attached to a first part of a machine and the movable part is configured to be in sliding contact with a second part of the machine, wherein at least one vibration sensor is fixed to the movable part of the seal lip; and a data processing device for processing data obtained from the vibration sensor and to monitor the vibration signals obtained by the sensor, wherein the data processing device is configured to evaluate a change in the vibration signals obtained by the vibration sensor in response to the operational event with respect to a signal obtained for a new sealing assembly in order to determine a parameter indicative of a degradation of the sealing assembly and to issue a warning signal if the degradation exceeds a threshold value.

7. A sealing assembly comprising:

a seal body and an elastic seal lip having a movable part attached to the seal body, the seal body configured to be attached to a first part of a machine and the movable part is configured to be in sliding contact with a second part of the machine, wherein at least one vibration sensor is fixed to the movable part of the seal lip; and a data processing device for processing data obtained from the vibration sensor and to monitor the vibration signals obtained by the sensor, wherein the data processing device is configured to extract a high frequency part of the signal of the vibration sensor and to derive elastic properties of the seal lip from the high frequency part of the signal.

8. A sealing assembly comprising:

a seal body and an elastic seal lip having a movable part attached to the seal body, the seal body configured to be attached to a first part of a machine and the movable part is configured to be in sliding contact with a second part of the machine, wherein at least one vibration sensor is fixed to the movable part of the seal lip; and a data processing device for processing data obtained from the vibration sensor and to monitor the vibration signals obtained by the sensor, wherein the data processing device is configured to determine a parameter indicative of the lubrication quality based on high frequency components of the signal obtained by the sensor.

9. A sealing assembly comprising:

a seal body and an elastic seal lip having a movable part attached to the seal body, the seal body configured to be attached to a first part of a machine and the movable part is configured to be in sliding contact with a second part of the machine, wherein at least one vibration sensor is fixed to the movable part of the seal lip; and a data processing device for processing data obtained from the vibration sensor and to monitor the vibration signals obtained by the sensor, wherein the data processing device is configured to calculate a parameter indicating ageing of the sealing lip.

* * * * *